March 31, 1964     J. E. ADAMS ETAL     3,126,809
PHOTOGRAPHIC DISTORTION APPARATUS
Filed Jan. 19, 1961     4 Sheets-Sheet 1
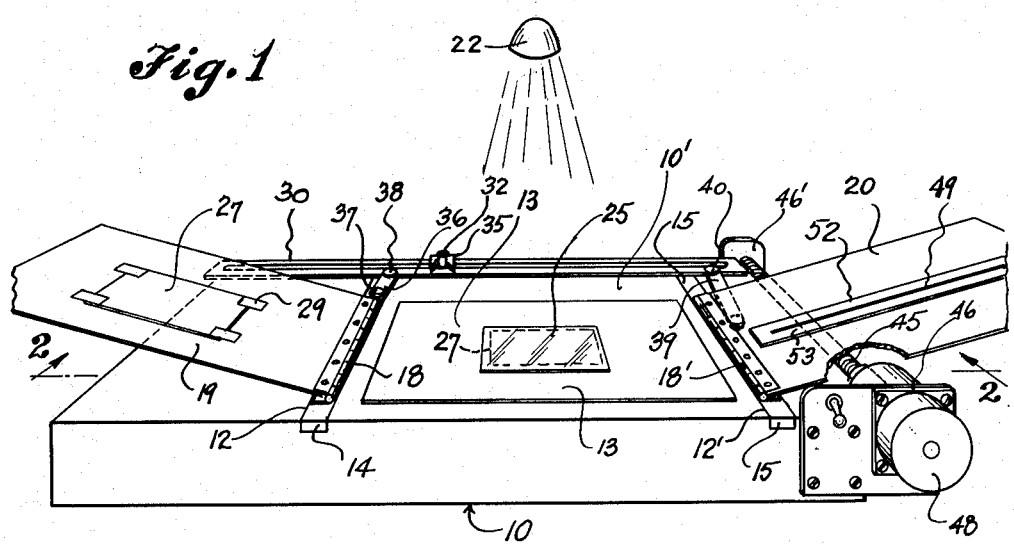
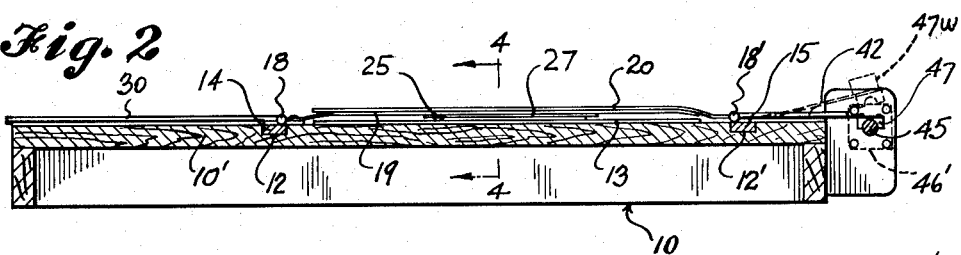
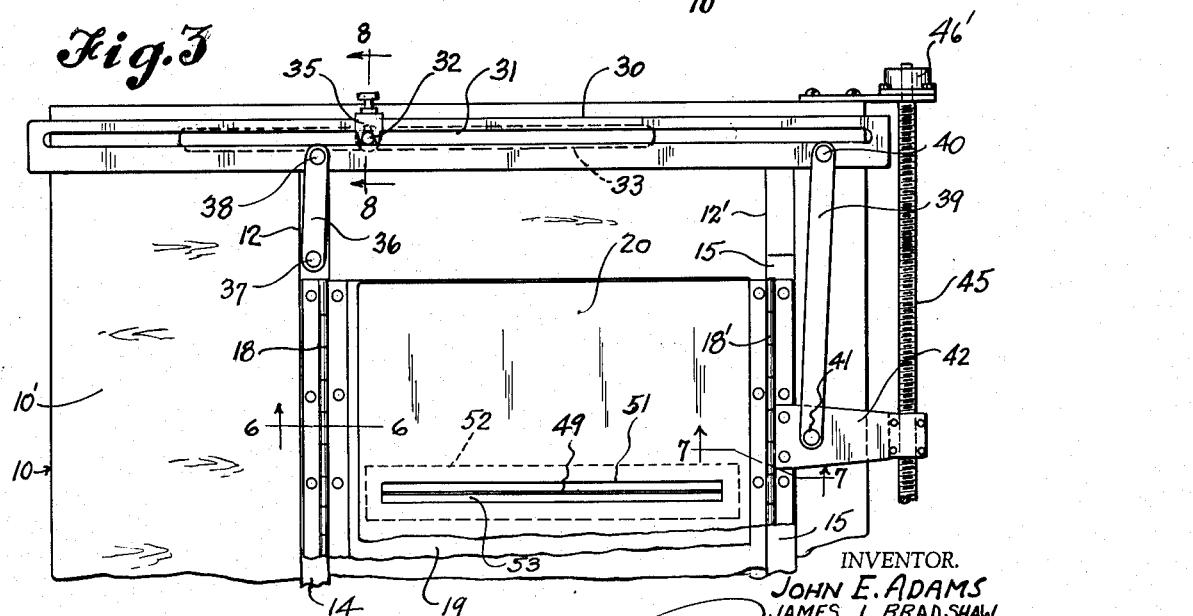
INVENTOR.
JOHN E. ADAMS
JAMES J. BRADSHAW
BY Robinson + Berry
ATTORNEYS

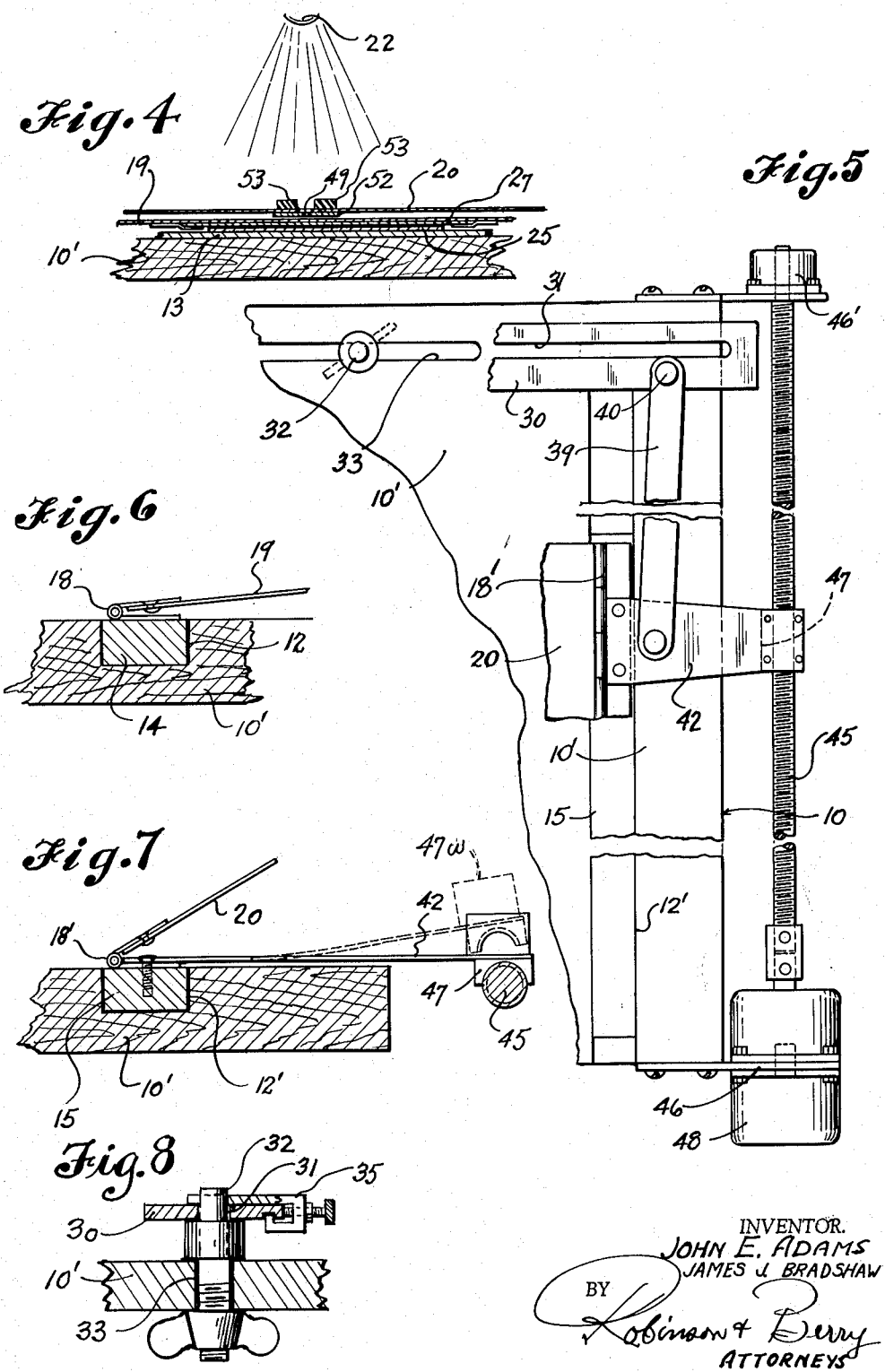

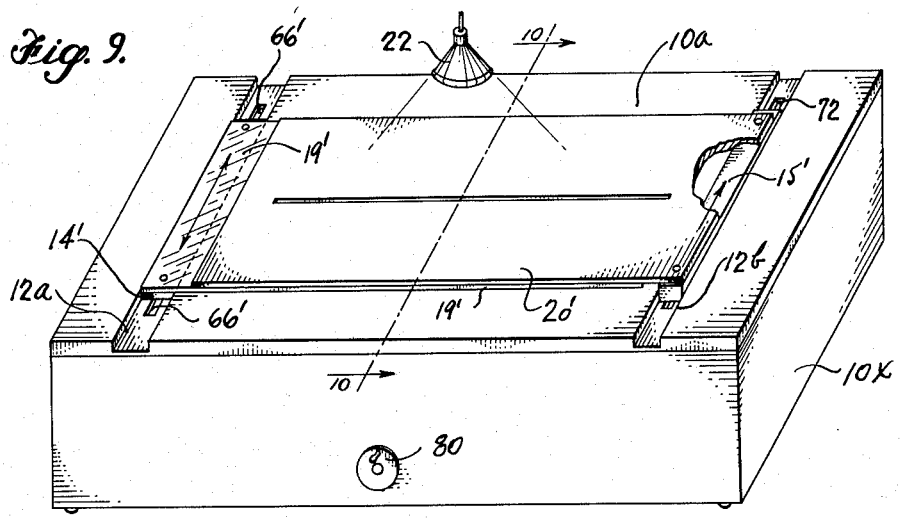
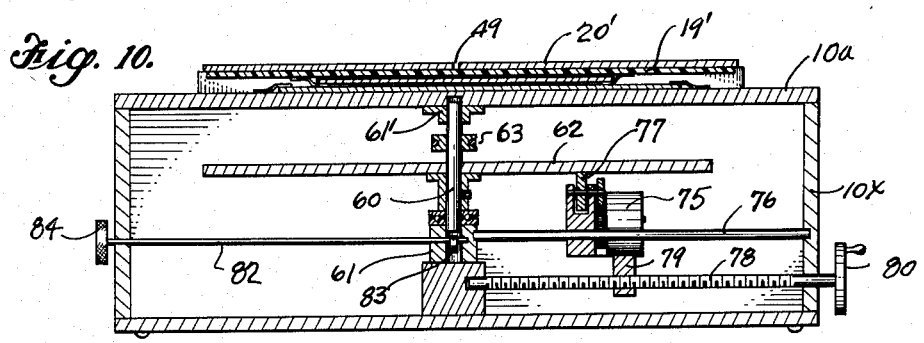
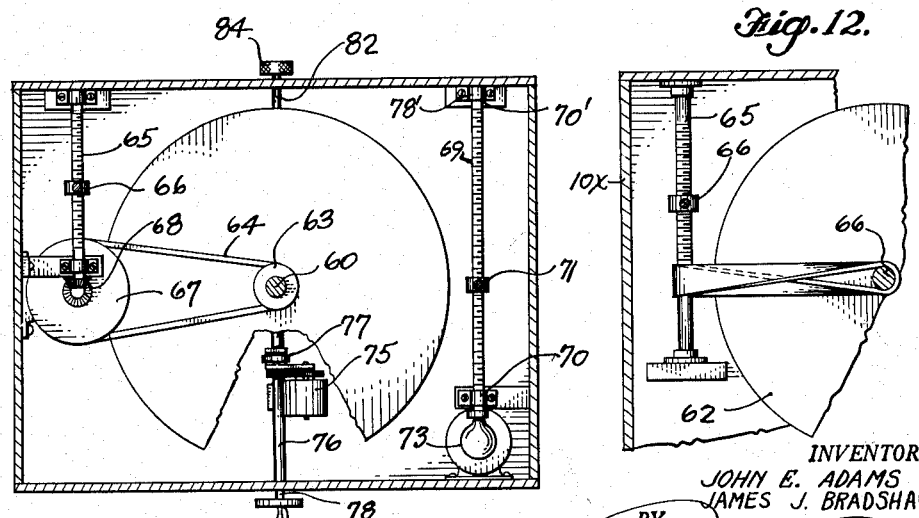

March 31, 1964 J. E. ADAMS ETAL 3,126,809
PHOTOGRAPHIC DISTORTION APPARATUS
Filed Jan. 19, 1961 4 Sheets-Sheet 4

INVENTOR.
JOHN E. ADAMS
JAMES J. BRADSHAW
BY Robinson + Berry
ATTORNEYS

United States Patent Office 3,126,809
Patented Mar. 31, 1964

3,126,809
PHOTOGRAPHIC DISTORTION APPARATUS
John E. Adams, 11015 Dayton Ave., and James J. Bradshaw, 9833 45th SW., both of Seattle, Wash.
Filed Jan. 19, 1961, Ser. No. 99,651
11 Claims. (Cl. 95—75)

This invention relates to means for effecting a novel method for controlling photo distortion. More particularly, to a process or method wherein a photo sensitive material on which the distortion is to be formed; the negative or image of the copy or composition to be distorted, and a mask or shutter formed with a slit substantially across the full width of it for passing exposure light are caused to be moved relative to each other during a predetermined exposure period.

The method for the controlled distortion is adapted to be practised by use of various machines hereinafter described. Those first described are photo printing machines in that they use a negative and make a positive print from it. The latter machine described is of a camera type and uses a regular graphic arts type camera with a special focal plane type slit shutter, plus provision of means for moving the photo sensitive material or for making the projected image at the focal plane move, by moving the copy or by moving the camera lens.

In the following specification, any subject matter that is suitable for photographic distortion by the present apparatus will, for convenience, be referred to by the general term "composition." While the most common form of composition, at present, is the film on which photographs have been developed, it may also include drawings on transparent paper or cloth or on other media not inconsistent with that herein mentioned.

The present invention further relates to a method or methods whereby the photographic film or carrier of any selected composition can be photographically reproduced in a form that is distorted either in length, width or inclination and which also may be given an undulatory or curved alignment, or given various other forms of distortion, as will hereinafter be disclosed.

Another object of this invention is to provide a distortion machine wherein the desired distortion is effected by causing a controlled relative movement of a photographically sensitive medium on which the distortion is to be formed or printed and the transparent carrier, designated as the negative or photographic film of the selected composition, while subjected to light emanating from an exposure lamp and caused to pass to and through the film to the sensitized medium through a narrow light passing slit formed in a mask or shutter; which mask or shutter is moved in such manner as to cause the slit to progressively traverse the composition during the required exposure period and while the negative or the sensitized medium are being moved, relative to each other.

It is a further object of this invention to provide novel mechanism whereby the rate and direction of relative movement of the photographically sensitive medium, referred to herein as the "print" and the film or negative can be controlled, thus to establish a desired degree of distortion of the composition in width, length or alignment.

Yet another object of the invention is to provide a method of and devices for the above purpose in various types and forms, as for example, in flat or cylindrical form, as hereinafter described and which method also is applicable in principle to camera types of picture taking mechanisms.

Further objects and advantages of the present invention reside in the details of construction of parts of the various mechanisms employed; in the relationship, or combination of the parts and in the mode of operation of the various devices for accomplishing the desired results.

In accomplishing the above mentioned and other objects of the invention, we have provided the improved details of construction, the preferred forms of which are illustrated in the accompanying drawings, wherein:

FIG. 1 is a perspective view of what we will hereinafter refer to as a "flat type" of distortion producing apparatus embodied by the present invention, shown in what will be called its "open" position.

FIG. 2 is a vertical section taken transversely of the apparatus substantially on line 2—2 in FIG. 1 but shown with negative and mask carrier parts in "closed" positions.

FIG. 3 is a fragmental top or plan view showing the distortion controlling lever and the linkage that connects it with certain relatively movable parts which effect the controlled distortion in the printing operation.

FIG. 4 is an enlarged sectional detail, taken on line 4—4 in FIG. 2, showing overlying film carrying and masking parts in their closed positions and relationship to give a better illustration and understanding of their functions.

FIG. 5 is an enlarged plan view of the rocker lever actuating screw; its mounting means and driving motor and also showing the connecting linkage between the ends of the lever and the carriers for the negative and movable mask.

FIGS. 6 and 7 are enlarged cross-sectional details of the movable guide bars to which the mask and negative carrier hinges are attached; taken respectively on lines 6—6 and 7—7 in FIG. 3.

FIG. 8 is an enlarged cross-sectional view taken on line 8—8 in FIG. 3, showing the pivot pin locking clamp in place.

FIG. 9 is an isometric view of another "flat type" distortion machine of alternative form.

FIG. 10 is a vertical, cross-section taken on line 10—10 in FIG. 9, showing the driving and drive control mechanism of the negative carrier.

FIG. 11 is a plan view showing the driving mechanisms of both negative and mask carriers employed in the machine of FIG. 9.

FIG. 12 is a fragmental showing of an alternative form of driving connection for shifting the negative carrier slide bar in a "flat type" distortion machine.

Figure 13:
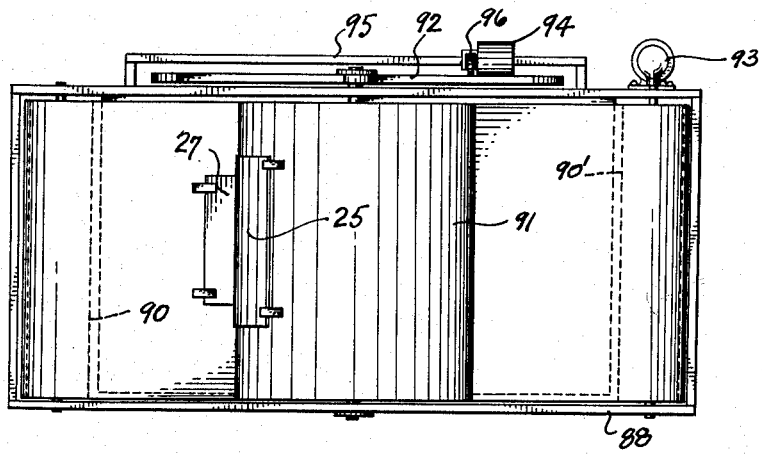

FIG. 13 is a plan or top view of what we have designated as a "rotary" or "cylindrical form" of distortion apparatus.

Figure 14:
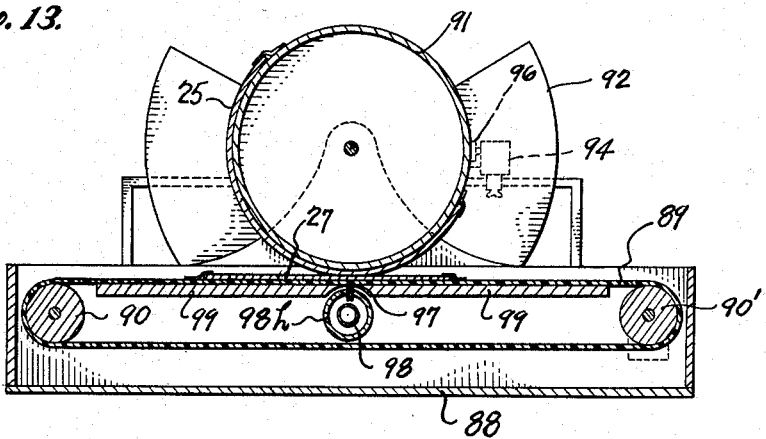

FIG. 14 is a section taken lengthwise of the machine of FIG. 13.

Figure 15:
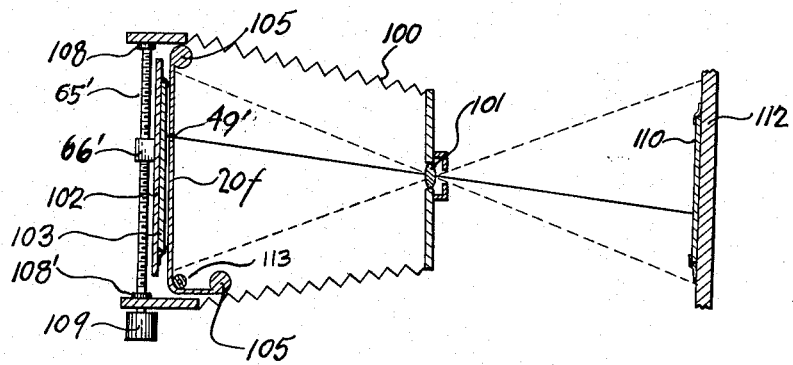

FIG. 15 is a view, schematically illustrating the embodiment of the present idea with a camera type of machine.

Referring more in detail to the drawings:

The simplified flat form of apparatus shown in FIGS. 1 and 2 comprises a horizontally disposed and rectangular base structure, designated in its entirety by reference numeral 10; this structure having a flat top surface of substantial dimensions. For a better understanding, of the size of the base structure, it will here be stated that in ordinary practice, it will have a side to side width of approximately 30"; a top to lower edge width of about 20" and a depth of approximately 5". This base structure is hollow and serves as a sort of supporting table for mounting thereon the various mechanisms and parts necessary in carrying out the distorting operation. The top wall 10' of this base structure is formed near opposite side edges, with parallel channels 12 and 12', extending from its top to its lower edge; these channels being about 3/16" deep; 3/4" wide and spaced about 18". Preferably, the channel 12', which is at the right hand side of the table, as well shown in FIG. 2, would be about 2″ from and parallel with that side edge. These above given dimensions and preferred location of the channels in the table top are not critical but are given merely for better understanding of the present construction.

Disposed on the top surface of the top wall 10′ of the base structure 10 between the parallel channels 12—12′ is a thin sheet of cardboard, 13, or the like, which is adhesively or otherwise flatly fixed in position. This card 13 is herein after designated as the "mat." Its use is optional.

Fitted in the two top wall channels 12 and 12′, respectively, for easy endwise, slidable movement therein are guide strips, or bars, 14 and 15, preferably of plastic or metal; each of which has its top surface flush with the top surface of the wall 10′. In the present instance, each bar has a length of about 12″ but this dimension is variable.

Attached to the left hand guide bar or strip 14 and extending therealong to its full length, is one wing of a piano type hinge 18, to the other wing of which one edge of a somewhat flexible, transparent plastic sheet 19 is fixedly attached, thus to provide for the swinging "opening" and "closing" movements of the sheet between its position flatly overlying the pad 13 in which it has been shown in FIG. 2, and a position disposed at the left hand side of the base 10 as in FIG. 1. Likewise, a masking sheet 20 of relatively heavy, flexible material, that is impervious to passage of light, except as hereinafter explained, is hingedly attached at one side edge, by means of a piano type hinge 18′, to the guide bar 15 for the swinging movement of the sheet 20 from a position overlying the sheet 19, as positioned in FIG. 2, across the top wall of the base, to a position extending outwardly therefrom, as shown in full lines at the left hand side in FIG. 1.

The two sheets of material 19 and 20 are substantially the same size, and when disposed over the table top in the order shown in FIG. 2, they will each extend across and fully cover the mat 13 and area of the top between the channels 12—12′.

For explanatory purposes the transparent plastic sheet 19, at the left hand side will herein be referred to as the "negative carrier" and the flexible sheet 20 will be designated as the "mask." The relationship of these sheets 19 and 20 to the mat 13 and to each other during an exposure period, is as shown best in FIG. 2, and in the sectional detail shown in FIG. 4.

The exposure lamp used with the present apparatus is designated in FIGS. 1, 4 and 9 by numeral 22 and it is shown as being located directly above the table at the required distance to serve its intended purpose. The lamp may be of any suitable kind for this purpose.

To prepare for obtaining a distortion print of a drawn or photographed composition, the two sheets 19 and 20 are first swung to "open" positions as shown in FIG. 1. Then a negative of the photographed composition from which the distortion is to be made is laid or positioned on the mat 13, generally at a central location and is squared up by alignment with reference lines provided on the mat. Then, the negative carrier sheet 19 is swung from its open position to its closed position, overlying the mat and negative as positioned thereon and the negative is caused to be attached to the then underside surface of the negative carrier sheet 19. Preferably this attachment of the negative is effected by applying small pieces of adhesive tape to the under surfaces of the corner portions of the negative before it is laid in position on the mat with end portions of the tape projecting slightly beyond the negative edges with adhesive surfaces faced upwardly, thus to cause their adherence to the negative carrier 19 when it is folded over and pressed down against the mat and negative. After this attachment of negative 27 to negative carrier 19 has been effected, the carrier is swung to open position, as in FIG. 1.

Now while working under "dark room" facilities as in normal photographic printing, a sheet of photographically sensitive paper 25 of suitable size is placed at the proper location on mat 13 and is squared up with respect to the reference lines thereon and this is secured on the mat against slippage from the set position by corner tacking or by use of small pieces of adhesive tape or other suitable and easily releasable means not herein shown. This sensitized sheet or medium 25 will hereinafter be referred to as the "potential print."

With the potential print or sensitized sheet 25 thus secured to the stationary pad 13 and the negative 27 thus secured to the surface of the negative carrier 19, the latter is then folded over the pad 13 and print 25, as in FIG. 2. Then, the masking sheet 20 is folded over the negative carrier 19, thus bringing the several parts 13, 26, 19 and 20 to the relative overlapped positions in which they are shown in FIG. 2 in preparation for the exposure required for the distortion printing.

It has previously been mentioned that the desired distortion of the composition of negative 27 is effected by causing relative movement over the sensitized medium 25 by negative 27 as assembled in FIG. 2, while subjected to exposure light from the lamp 22; this light being admitted thereto through a narrow slit in the mask that is caused to progressively transverse a cross section of the negative as it is moved over the sensitized sheet. The mechanism for effecting the relative movement of the combined mask 20 and slit 49 and the negative 27 will now be described and this description will be followed by a disclosure of the manner of formation of the light slit in the mask and means for moving the mask to cause the mask slit to traverse the negative during the exposure period.

It is shown in FIG. 1, but better seen in FIG. 3 that a flat, elongated lever 30 extends across the upper or top portion of the base structure 10. This lever is formed with an elongated slot 31, extending lengthwise thereof. This slot receives a vertical pivot stud 32 therein which stud is adjustable to various positions along the slot. This stud is similarly adjustable within and along a slot 33, see FIGS. 5 and 8 that is formed in and across the top portion of the table top 10′. By adjustment of this stud 32 along its slot 33 and relative to lever 30, the proportionate length of the lever arms, at opposite sides of the pivot stud may be varied as desired and without changing the endwise position of the lever 30 relative to the table top.

A clamp 35 is movably adjustable and holdingly applied to the lever 30 and is notched for holding engagement with the pivot stud as a means to retain the location of the pivot relative to the lever after an adjustment has been made.

A short link 36 is pivotally connected at one end to the upper end of slide bar 14, as at 37 in FIG. 3, and at its other end is pivoted to the left hand end portion of lever 30 as at 38, but well within that end limit of slot 31. Likewise, a relatively long link 39 is pivotally connected at its upper end to the right hand end portion of lever 30, as at 40, and at its lower end is pivotally connected as at 41 to a relatively rigid but upwardly bendable metal plate 42 that is attached at its left hand edge to the slide bar 15 and extends therefrom laterally beyond the adjacent edge of the table top, across a threaded feed shaft 45 that extends along and is mounted on the end wall of the base structure by bearings 46 and 46′ as in FIGS. 3 and 5.

Fixed on the underside of the free end of the flexible plate 42, in position to mesh with threads of the feed shaft 45, is a half nut 47. This nut may be disengaged from the shaft by flexing the plate upwardly, as indicated in dash lines in FIG. 7, thus to provide for endwise adjustment of the slide bar 15 along its channel 12′ as required for properly positioning the mask 20, preparatory to travel of its light passing slit across the negative and print.

The feed shaft or screw 45 is operatively connected at one end to the drive shaft of an electric motor 48 supported by and from the lower edge of the base structure 10, as best shown in FIGS. 1 and 5.

It will be understood that, through the nut 47 as engaged with the threads of the shaft 45 and the plate 42 as attached to slide bar 15, the lever 30 can be caused to be pivotally rocked on the pivot stud 32 thus to simultaneously shift the slide bars 14 and 15 in opposite directions, and cause the negative carrier 19 and mask 20 to move in opposite directions; the negative carrier 19 in the present instance moves upwardly relative to the mat 13 while sensitized sheet 25 is attached to the mat. The rate of relative movement is in accordance with the effective lengths of the lever arms provided at opposite sides of pivot 32 as established by the location of pivot stud.

It has been previously mentioned herein that a slit is provided in the mask 20 for passage of exposure light from lamp 22. This slit is located horizontally across a medial portion of the mask as shown in FIG. 3. In the provision of this light passing slit, the mask 20 is first formed thereacross with a slot 51 about ¼" or more wide and this slot is covered by a strip of exposed photographic film 52, affixed to the underside of the mask and in which film strip a very narrow light passing line 49, which defines the width of the light passing slit has been photographed. The only light that can pass through the mask 20 is that which passes through the photographed line in the film strip.

It has been found quite desirable in the use of this apparatus to apply strips of rubber 53 to top of mask 20, as in FIG. 4, to give additional weight to the mask closely along the slit 49 thus to hold the mask firmly against the negative carrier and improve contact between negative and print as the slit passes thereacross.

In the positioning of the mask, preparatory to an exposure period, it is usually first adjusted well toward the top of the housing thus to place the light slit 49 above the line of the top edge of the sensitized medium 25 and negative 27. Then the lifted half nut 47 is permitted to be engaged with shaft 45. This nut may be weighted 47w, if necessary, to hold its driving position.

With the apparatus so constructed, its most common manner of use in making a distortion of a composition would be as follows:

Assuming that the negative 27 of the composition has been attached to the negative carrier 19 and the potential print 25 has been positioned on the mat 13 and that these parts have been swung to their closed positions, as in FIG. 2, with the mask so located that the light slit 49 is above the position of film and potential print 25, and the half nut 47 has been dropped into meshing engagement with threads of shaft 45, the motor 48 is now started and the exposure lamp 22 is turned on. With the travel of the nut 47 along the shaft 45, the incident rocking or first class action of lever 30 on pivot 32 will cause the mask to be shifted downwardly and the negative carrier shifted upwardly; their relative rates of movements being in accordance with the length of the lever arms provided by lever 30 at opposite sides of the pivot 32.

It will be understood that if the pivot 32 should be shifted to the left to such extent as to locate it at the left of or outside of the point 38 of pivotal connection of link 36 with the lever 30, then the parts 19 and 20 will be caused to shift up or down in the same direction (2nd class lever action) in accordance with the length of their respective lever arms, but when the pivot 32 is located between the points of pivotal connection 38 and 40 with links 36 and 39, the shifting movements of these parts 19 and 20 will be in opposite directions (1st class lever action).

Printing is effected with the travel of the light slit 49 across the negative 27. If a distorted print is made with the negative carrier 19 and slit mask moving in the same direction, the distortion will be longer than the negative original. If made with the negative carrier and mask moving in opposite directions the distortion will be shorter. The extent of distortion in either instance may be varied, to more or less extent by changing the position of the pivot 32 along slot 31 between pivot 40 and the extreme left end of the slot. The exposure time is in accordance with the time required for the slit 49 to traverse the negative.

In FIGS. 9, 10 and 11, I have illustrated an alternative "flat" form of distortion apparatus operating on the same principle as that shown in FIG. 1, already described, but embodying another type of driving mechanism for effecting adjustment and movement of the negative carrier and mask. This device comprises a rectangular, box-like housing 10x having a flat top wall 10a corresponding to the top 10' of the device of FIG. 1, and which top wall is formed in its top surface with parallel channels 12a and 12b corresponding in position and relationship to the channels 12 and 12' of the device of FIG. 1 and in which channels slide bars 14' and 15' are similarly contained. Between the channels 12a and 12b the top surface if flattened for disposition of the photo-sensitive sheet of material or print thereon and to the slide bars 14' and 15', the negative carrier sheet 19' and mask 20' are fixed in the same or in a manner that is equivalent to that shown in FIG. 1 for their use in the same way as previously described. For the endwise adjustment of the slide bars 14' and 15' in their channels we provide the mechanism that is best shown in FIG. 10, wherein it is observed that a vertical shaft 60 is supported centrally in the housing for rotary and slight endwise movement in bearings 61—61'. Fixed horizontally on this shaft 60 is a friction disk 62 of substantial diameter and fixed to the shaft above the disk is a relatively small pulley wheel 63 about which a belt 64 is extended for a purpose presently disclosed.

Mounted horizontally in the housing 10a parallel with and below the guide slot 12a, is a shaft 65 on which a nut 66 is threaded and which nut has a connection, made through a slot 66' in top 10'a with the bar 14'. Also, at that same side of the housing 10'a a relatively large belt wheel 67 is mounted and about which the belt 64 is extended so that rotation of the shaft 60 and wheel 63 thereon will effect rotation of wheel 67 which has a geared driving connection as at 68, with the shaft 65, and will operate to rotate this shaft and cause shifting of the bar 14' accordingly.

Likewise, at the right hand side of the housing 10a a horizontal shaft 69 is mounted for rotation in bearings 70—70' and threaded on this shaft is a nut 71 which has a holding connection, through a slot 72 in the top wall 10' of the housing, with the slide bar 15' for moving the mask in accordance with rotation of shaft 69.

The means for driving shaft 69 comprises a constant speed electric motor 73 mounted in direct driving connection therewith as shown in FIG. 11.

The means for driving and for varying the speed of rotation of the disk 62 is shown in FIG. 10 to comprise an electric motor 75 that is supported for travel along a fixed bar or guide 76 that extends horizontally from and radially of the shaft 60. The motor 75 is of the gear head type and has a friction wheel drive, as at 77, with the underside of the disk 62. Shifting of the motor along the rod 76 toward or from the shaft 60 varies the speed of rotation of the shaft accordingly and this varies the rate of movement of slide 14' and film carrier 19' as attached thereto.

The means for shifting the motor 75 comprises a threaded shaft 78 mounted below and parallel with guide rod 76, and on which shaft a nut 79, that is fixed to the bottom of the motor 75, is mounted for travel. Rotatable adjustment of shaft 78 is effected by a crank 80 fixed to its outer end, and movement of the motor toward or from the shaft 60 increases and decreases the rate of rotation of the friction disk accordingly.

It is also shown that a rod 82 extends horizontally from outside the housing to the bearing 61 where it carries a cam 83 that engages the lower end of shaft 60. At its outer end, the rod 82 has a knob handle 84 whereby the rod may be manually rotatably adjusted to cause the cam to slightly lift the shaft 60 and friction disk 62 to clear the latter from driving contact with the motor friction wheel 77 for setting the rate of movement of the film carrier 19' and mask by inward or outward adjustment of motor 75.

In lieu of the belt drive for shaft as shown in FIG. 11, it is practical to provide a belt connection directly between shafts 60 and 65 as has been shown in FIG. 12.

A simplified means of providing variable speed to shaft 65 is to have a power stat type of speed control on a motor that is connected directly to shaft 65. This power stat varies and controls shaft speed with an electrical control rather than a mechanical control.

In FIG. 13, I have illustrated a rotary type of distortion means comprising a base frame structure 88 in which a belt 89 of substantial width is mounted for horizontal travel about supporting rollers 90—90' mounted at front and rear ends of the base frame, transversely thereof, for axial rotation is a cylinder 91 which at one end, is equipped with a driving disk 92 coaxially thereof. The belt 89 is driven by a constant speed gear head motor 93 shown in FIG. 13 to have driving connection with roller 90'. The cylinder 91 is adapted to be rotatably driven by an electric motor 94 that is mounted on frame structure 95 for adjustment parallel with the disk 92 and which has a friction disk 96 in contact with the outer disk surface through which speed of rotation of the cylinder may be varied in accordance with adjustment of the motor toward or from the axial line of the disk.

The belt 89 is comprised of a transparent "Mylar" and located in the frame structure directly below and parallel with the cylinder, and also between the upper and lower runs of the belt, is a thin Lucite strip 97 beneath which is a fluorescent lamp 98. The lamp is enclosed in a light proof housing 98h. At opposite sides of this strip the top run of the belt may be supported for travel on supporting plates 99—99.

In the use of this machine, the sheet of photographically sensitive medium 25 will be attached to the circumferentially curved outside surface of the cylinder 91 as shown, and the negative 27 will be applied flatly to and upon the belt 89. Starting of the motor 93 causes the belt to carry the negative 27 toward and beneath the cylinder and motor 94 causes rotation of the cylinder at any adjusted speed provided for by the adjustment of the friction drive 96. The distortion of the print will be in accordance with the extent and direction of relative movement of the negative 27 and print 25 as they pass in close contact across the top edge of the translucent Lucite bar 97. If the belt 89 moves faster than the turning speed of the cylinder, then the distortion will be of shorter length than the original. If slower, it will be longer. This device operates on the same principle as the two machines previously disclosed and affords some advantages thereover.

The principle of distortion printing of these machines may be applied also to cameras as has been disclosed in FIG. 15 which more or less diagrammatically discloses the necessary parts of a graphic art type of camera and a distortion apparatus of the present character as applied thereto according to the present invention. In this view the camera is designated generally by reference numeral 100, and is seen to include the lens 101 at one end and is equipped within its opposite end portion with a mounting plate 102 for a sheet 103 of photographically sensitive material. Immediately forward of this plate 102 is a focal plane shutter 20f that is adapted to be wound onto and from supporting rollers 105 driven by a constant speed reversible motor 113 in such manner as to cause it to move across the sheet 103; this shutter having a light slit 49' therein that can thereby be caused to traverse the sensitized sheet 103.

It is shown herein that the plate 102 is supported by a block 66' that is threaded onto a supporting rod 65' carried at its ends in bearings 108—108', and having operative connection at its lower end, which is outside the camera, with a variable speed reversible controlled motor 109.

The shutter 20f is caused to be moved up or down by a constant drive motor 113 which might be like #73 of FIG. 11. The composition 110 to be distorted would be mounted on a copy holding board 112 located in the proper range of the lens.

To make the distortion, the image of the composition is projected by the lens 101 to the shutter 20f. As the shutter travels, a desired relative movement of the sensitive sheet 103 is effected by moving the plate 102 up or down. Italic forms can be achieved by changing movable back to a 90° angle from direction of focal type shutter slit. As the light slit in the shutter traverses the sensitized medium the distortion is formed on the print.

It is anticipated also that the film carrier 102 might be held stationary and the distortion effected by simultaneous movements of the slit shutter and copy board 112.

Another method of camera distortion can be achieved by simultaneous movements of focal plane shutter and camera lens.

On the camera adaption the projected image takes the place of the negative used on the aforementioned machines.

The invention, in its various forms, as described, is believed to be unique in that it provides for making distortion prints directly from undistorted negatives with no lens loss or rephotographing loss in sharpness or detail. The photographic distortions can be made with no fringe loss of resolution since the basic principle is a "moving contact print" in the machine models. Similarly, the projected image is mechanically, not optically, altered in the camera type device; no eccentric or supplementary lenses or varying depth of field being needed.

Variable distortion, both greater and lesser amounts of distortion in the same plane, can be achieved by the mechanical process.

Various shapes of light mask openings can change straight line copy, lettering, etc., into wavy lines, curves, etc.

This invention can thus make photographic distortion of shorter, longer, slanted in any direction or amount, curved or wavy images at the operator's will, solely by mechanical movement and not by the use of special distortion type lenses.

As described herein, the process can be practiced at less expense in time and material and the printed results will be sharper.

*Method of Distortion*

To distort without a camera, the following items are required:

(1) A negative of the desired image (undistorted).
(2) A movable mask with a light slit.
(3) An exposure light.
(4) A piece of photosensitive material.

In normal photographic printing practice the entire sheet is exposed at one time; this method differs in the following manner:

Start at one edge and expose a thin line area by means of a moving mask with a light slit in it while simultaneously moving either the printing paper or the negative in a controllable manner. The speed and the direction of movement determines the type and amount of distortion—that is, if we desire to lengthen a photo in one direction, either the potential print or the negative must move in the same direction, but at a slower speed. The resultant print is distorted longer because these movements have caused a greater area to be exposed than was contained in the original negative. The opposite effect (shortening) is caused by having either the paper or the negative travel simultaneously in the opposite direction of the moving light slit—consequently exposing a shorter image area than the original negative contained. A slanted or italic effect can be accomplished from straight copy by mounting the negative on any predetermined diagonal direction to mask the slit. Another italic effect can be achieved by moving the negative carrier sideways while the mask travels in the usual up or down direction.

Substituting the straight slit 49, with a curved or wavy line causes the printed copy to follow that shape.

The anamorphic results described above are all in conjunction with the controlled, simultaneous movement of any two of the three units involved, slit mask, negative carrier, and sensitized medium.

In most practices, the negative carrier, and light slit move while the sensitized medium remains motionless. An alternate method would be to cause the sensitized medium and light mask to move while the negative remains stationary.

After the above type of exposures, the photosensitive material is developed and fixed in the usual manner.

The essence of the invention as disclosed herein resides in the achievement of controlled photographic distortion through the relative movement of two of the three components described in the three paragraphs following:

(a) A narrow slit of light, achieved either by projection, or by exposure through a light passing slit or through an edge lighted strip of transparent or translucent plastic material.

(b) An undistorted negative, positive or photographic image, prepared either photographically, mechanically or manually.

(c) A photo-sensitive material to receive the new distorted image from the aforementioned undistorted negative, positive or image.

The above combination serves as a "mechanical lens" which makes a moving "contact print" of a greater or lesser area in any direction on which distortion is desired.

In the terminating claims, the word "negative" will be understood to designate any suitable photographic image whether negative or positive, prepared either photographically, mechanically or manually. The photosensitive medium, designated in the claims may be the usual sensitized paper or sensitized plate so long as not inconsistent with the present invention.

What we claim as new is:

1. A distortion apparatus comprising a base providing a top surface formed with a pair of bar guide channels, a photo-sensitive medium disposed for printing on said surface, a bar slidably contained for endwise shifting in each of said channels, a transparent sheet fixed to one bar to extend therefrom across said photo-sensitive medium as disposed on said top surface, a negative removably applied to said transparent sheet at a location registered with and flat upon said photo-sensitive medium, a light impervious mask fixed to the other of said bars to extend therefrom across and flat upon said transparent sheet and negative; said mask being formed with a slit for the passing of exposure light therethrough, means for moving one of said bars to cause relative movement of said negative and said photo-sensitive medium and means for moving the other bar to shift the mask to cause the light passing slit therein to traverse the negative during the period of relative movement of negative and photo-sensitive medium.

2. Apparatus according to claim 1 wherein said mask is formed with a slot of substantial width that is covered by a removable strip of exposed film in which relatively narrow lines have been photographed as the light passing slit.

3. A distortion apparatus of the character described comprising a base providing a supporting surface formed with laterally spaced, parallel channels, a photo-sensitive medium disposed for printing, on said surface between said channels, a bar slidably fitted in each of said channels for endwise movement therein, a transparent sheet fixed along one side edge to one of said bars and adapted to be laid across said photo-sensitive medium as placed for printing on said surface; a negative attached to said transparent sheet in a location registered with and flatly upon with the photo-sensitive medium, a light impervious mask fixed at one edge to the other bar to extend over and across and flatly upon the transparent sheet and negative; said mask being formed with a transverse light passing slit, an exposure lamp located above the mask, means for moving one of said bars to cause relative movement of the negative and said photo-sensitive medium and means for moving the other bar to shift said mask and cause said light passing slit of the mask to traverse the negative to effect printing through the negative as it is being moved relative to the photo-sensitive medium.

4. The distortion apparatus of claim 3 wherein said transparent sheet and mask are hinged to their moving bars thus to adapt them to be swung in opposite directions from overlapping to positions extending outwardly relative to each other for application of the sensitized medium to or its removal from the base surface.

5. The apparatus of claim 3 wherein the means for effecting relative movement of said slidably mounted bars to cause shifting the negative and mask comprises a rocker lever disposed transversely of and across the base and means pivotally mounting said rocker lever for oscillating movement thereon, motorized means for effecting an oscillating action of said lever and linkage pivotally connecting the lever at points in spaced relationship therealong, with ends of the said slidably mounted bars.

6. The apparatus recited in claim 5 wherein said rocker lever is formed with a slot extending substantially to its full length and said base is formed with a transverse slot, and wherein said pivotal mounting means for said rocker lever is adjustable in and along the base slot and simultaneously adjustable in the lever slot selectively to points between or at the outside of the bar connecting linkage.

7. The apparatus of claim 6 wherein said motorized means for moving said bars comprises a revolubly driven threaded shaft and wherein a flexible plate is fixed to one of said bars to extend across said threaded shaft, and on which plate a threaded half-nut is fixed for meshing contact with said driven threaded shaft and which half nut is adapted to be lifted from the shaft for adjustment of said bars independently of the shaft.

8. An apparatus according to claim 7 wherein a variable speed mechanical disk drive is used between a reversible type electric motor and threaded shaft.

9. The apparatus of claim 3 in which is provided a threaded shaft to move the bar carrying said mask and slit, and a reversible constant speed motor to drive said threaded shaft.

10. A distortion printing apparatus comprising a base providing a supporting surface upon which a photo-sensitive medium and a negative of a composition from which a distortion print is to be made may be flatly disposed, one upon the other, for photographic printing, a light impervious mask overlying said negative and sensitized medium as disposed on said surface; said mask providing a transverse light passing slit through which exposure light may pass for printing, and a mechanism for effecting relative movement of said photo-sensitized medium and negative; said mechanism comprising a rocker lever with a pivotal support between its ends mounting it for oscillation in a plane parallel with said supporting surface, links individually connecting the negative and sensitized medium with the rocker lever at a different interval from the pivot point of said lever, and a powered means for effecting and controlling the oscillatory action of the lever and means for effecting movement of the mask to advance the light passing slit across the moving negative in a direction that is at a right angle to the direction of the slit 11. A distortion printing apparatus according to claim 10 wherein the sensitized medium and negative are fixed at opposite edges respective to movement guiding bars that are mounted in laterally spaced parallel channels in the supporting surface of said base and wherein said links are pivotally connected to the rocker lever at different distances from the pivot point of the lever.

References Cited in the file of this patent

UNITED STATES PATENTS

| | | |
|---|---|---|
| 1,176,384 | Lotka | Mar. 21, 1916 |
| 1,906,973 | Kingsbury | May 2, 1933 |